United States Patent
Ames et al.

(10) Patent No.: US 12,475,274 B2
(45) Date of Patent: Nov. 18, 2025

(54) INTELLIGENT BUILDING STRUCTURE PLANNER

(71) Applicant: BotBuilt, Inc., Durham, NC (US)

(72) Inventors: Christopher Barrett Ames, Durham, NC (US); David Miron, Durham, NC (US)

(73) Assignee: BotBuilt, Inc., Durham, NC (US)

(*) Notice: Subject to any disclaimer, the term of this patent is extended or adjusted under 35 U.S.C. 154(b) by 0 days.

(21) Appl. No.: 18/780,372

(22) Filed: Jul. 22, 2024

(65) Prior Publication Data

US 2024/0378333 A1 Nov. 14, 2024

Related U.S. Application Data

(63) Continuation of application No. 18/642,446, filed on Apr. 22, 2024.

(60) Provisional application No. 63/497,375, filed on Apr. 20, 2023.

(51) Int. Cl.
*G06F 30/13* (2020.01)
*B25J 9/16* (2006.01)
*G06F 113/24* (2020.01)
*G06F 119/18* (2020.01)

(52) U.S. Cl.
CPC ............ *G06F 30/13* (2020.01); *B25J 9/1671* (2013.01); *G06F 2113/24* (2020.01); *G06F 2119/18* (2020.01)

(58) Field of Classification Search
CPC .. G06F 2113/24; G06F 2119/18; G06F 30/13; B25J 9/1671
See application file for complete search history.

(56) References Cited

U.S. PATENT DOCUMENTS

| | | |
|---|---|---|
| 2010/0235206 A1 | 9/2010 | Miller et al. |
| 2012/0166146 A1 | 6/2012 | Cincotti |
| 2018/0210422 A1 | 7/2018 | Walker |
| 2021/0192101 A1 | 6/2021 | Kim et al. |
| 2024/0354457 A1 | 10/2024 | Ames et al. |

OTHER PUBLICATIONS

Altaf, M. S., Liu, H., Al-Hussein, M., & Yu, H. (Dec. 2015). Online simulation modeling of prefabricated wall panel production using RFID system. In 2015 Winter Simulation Conference (WSC) (pp. 3379-3390). IEEE. (Year: 2015).*

(Continued)

*Primary Examiner* — Bijan Mapar
(74) *Attorney, Agent, or Firm* — Goodwin Procter LLP

(57) ABSTRACT

A method for automatic panel design and fabrication includes receiving a two-dimensional or three-dimensional architectural plan for a building, converting the architectural plan into a first data file that contains information about a location, length, and style of each wall included in the architectural plan, obtaining, from the first data file, a list of walls to automatically generate a second data file that contains a list of panels to be constructed for each of the list of walls, and generating a set of commands for each of panels in the list and transmitting the set of commands to a robotic builder, to allow the robotic builder to automatically build each of the panels in the list.

20 Claims, 6 Drawing Sheets

(56) References Cited

OTHER PUBLICATIONS

Liu, H., Holmwood, B., Sydora, C., Singh, G., & Al-Hussein, M. (Jul. 2017). Optimizing multi-wall panel configuration for panelized construction using BIM. In Proceedings of the 2017 International Structural Engineering & Construction Conference (ISEC), Valencia, Spain (pp. 24-29). (Year: 2017).*

Altaf 2018 (Altaf, M. S., Bouferguene, A., Liu, H., Al-Hussein, M., & Yu, H. (2018). Integrated production planning and control system for a panelized home prefabrication facility using simulation and RFID. Automation in construction, 85, 369-383.) (Year: 2018).*

Lu (Lu, T., Tai, C. L., Bao, L., Su, F., & Cai, S. (2005). 3D reconstruction of detailed buildings from architectural drawings. Computer-Aided Design and Applications, 2(1-4), 527-536.) (Year: 2005).*

Villanueva, E. M., Mamledesai, H., Martinez, P., Poostchi, P., & Ahmad, R. (2021). Design and simulation of an automated robotic machining cell for cross-laminated timber panels. Procedia CIRP, 100, 175-180. (Year: 2021).*

International Search Report and Written Opinion for International Patent Application No. PCT/US24/25663, dated Aug. 7, 2024 (13 pages).

Lu (Lu, T., Tai, C. L., Bao, L., Su, F., & Cai, S. (2005). 3D reconstruction of detailed buildings from a rchitectura l drawings. Computer-Aided Design and Applications, 2(1-4), 527-536.).

* cited by examiner

```
1   dx = discretization of wall
2   l = length of wall
3   n = l / dx = number of steps along the wall
4   max_len = maximum length of a panel
5   min_len = minimum length of a panel
6   p_max = max_len / dx = maximum length of a panel in steps of dx
7   p_min = min_len / dx = minimum length of a panel in steps of dx
8   OPT[] = array of length n. OPT[j] is cost of optimal solution up to point j
9   cost(a, b) = cost function for a panel that starts at point a and ends at b
                 along the wall
10
11
12
13  OPT[0] = 0
14  for j = 1 to n
15      start_search = j - p_max
16      end_search = j - p_min
17      OPT[j] = min((OPT[i] + cost(i, j)) for i = start_search to end_search)
```

FIG. 3

INTELLIGENT BUILDING STRUCTURE PLANNER

CROSS-REFERENCE TO RELATED APPLICATIONS

This application is a continuation of U.S. application Ser. No. 18/642,446, filed Apr. 22, 2024, which claims the benefit of and priority to U.S. Provisional Patent Application No. 63/497,375 entitled "Intelligent Building Structure Planner," filed on Apr. 20, 2023, the content of which is incorporated by reference herein in its entirety.

TECHNICAL FIELD

This disclosure generally relates to the construction of building structures, and more particularly to systems and methods for automating the process of preparing building components in off-site construction from a design plan.

BACKGROUND

Wall panels are a staple in off-site construction. Companies are able to build wall panels in warehouses with a mix of large automation systems and employees, and ship these prefabricated panels to construction sites and craned into place on a foundation that has been constructed in advance. However, before any building can occur, the house must be turned into a series of panels, that is, each wall must be broken into sections that can be individually built and shipped in stacks. This process is referred to as panelization.

Currently, all panelization is done by hand or with limited software tools. To panelize one house, experienced designers work for one to four weeks depending on the experience of the designers, the complexity of the house, and other factors. This process takes a long time and is tedious and prone to errors.

Current software options employed by designers for designing panels do not do most of the work. Instead, existing software solutions mostly act as accounting, helping designers visualize the walls as the designers make decisions about where to split the wall into panels. In addition, when using these panelization software products, the designers first have to create a detailed digital clone of the building that is being constructed. This process, however, is very manual, and labor intensive, and requires extensive knowledge and experience with building information modeling software. Due to the above-noted challenges, automatic designing of wall panels has yet to become widespread in the construction industry.

The foregoing discussion, including the description of motivations for some embodiments, is intended to assist the reader in understanding the present disclosure, is not admitted to be prior art, and does not in any way limit the scope of any of the claims.

SUMMARY

To address the aforementioned shortcomings, a method and system for automatic panel design and fabrication are provided. The method includes receiving a two-dimensional or three-dimensional architectural plan for a building, converting the architectural plan into a first data file that contains information about location, length, and style of each wall included in the architectural plan, obtaining, from the first data file, a list of walls to automatically generate a second data file that contains a list of panels to be constructed for each of the list of walls, and generating a set of commands for each of panels in the list and transmitting the set of commands to a robotic builder, to allow the robotic builder to automatically build each of the panels in the list.

The above and other preferred features, including various novel details of implementation and combination of elements, will now be more particularly described with reference to the accompanying drawings and pointed out in the claims. It will be understood that the particular methods and apparatuses are shown by way of illustration only and not as limitations. As will be understood by those skilled in the art, the principles and features explained herein may be employed in various and numerous embodiments.

BRIEF DESCRIPTION OF THE DRAWINGS

The disclosed embodiments have advantages and features that will be more readily apparent from the detailed description, the appended claims, and the accompanying figures (or drawings). A brief introduction of the figures is below.

FIG. 3 illustrates an example algorithm for optimizing the panel design, according to embodiments of the disclosure.

DETAILED DESCRIPTION

Figure 1:
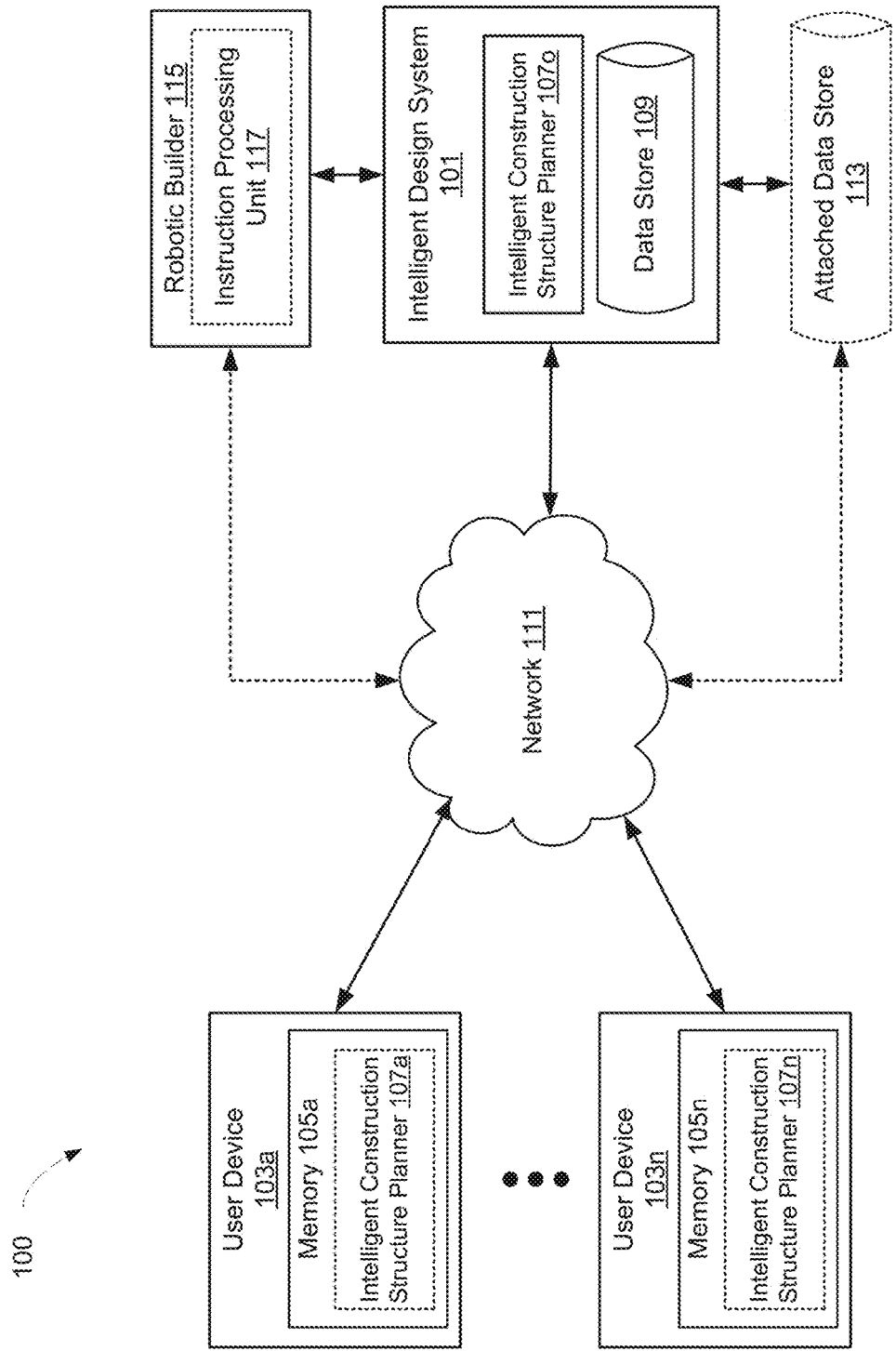
FIG. 1 is a block diagram of an example architecture for an intelligent construction structure design and fabrication system, according to embodiments of the disclosure.

The figures (FIGS.) and the following description relate to some embodiments by way of illustration only. It is to be noted that from the following description, alternative embodiments of the structures and methods disclosed herein will be readily recognized as viable alternatives that may be employed without departing from the principles of the present disclosure.

Reference will now be made in detail to several embodiments, examples of which are illustrated in the accompanying figures. It is to be noted that wherever practicable similar or like reference numbers may be used in the figures and may indicate similar or like functionality. The figures depict embodiments of the disclosed systems (or methods) for purposes of illustration only. One skilled in the art will readily recognize from the following description that alternative embodiments of the systems and methods illustrated herein may be employed without departing from the principles described herein.

Panelized construction comprises building components that are made in a factory environment and then shipped to the construction sites for incorporation into the buildings. With panelized construction, prefabricated building components, such as wall and floor systems, are set into place at the site with heavy equipment such as cranes. Because panels are constructed off-site, it often reduces waste and the time required to build. In addition, panelized construction can be customized, like stick frame construction, which offers flexibility to meet different customer requirements. This, however, requires a higher level of coordination and detailing during the design phase, which takes extensive expertise, and thus is a very slow and cumbersome process in the current panel design. In addition, it is prone to human error.

A technical solution provided in the present disclosure effectively addresses the technical problems faced by the existing panel design software tools and products by introducing an intelligent construction structure planning system (also referred to as "intelligent construction structure planner"). In some embodiments, the intelligent construction structure planner disclosed herein is configured to automatically design panels from a list of locations and types of walls, doors, and windows with no human input, and automatically design panels conforming to the specification of any particular building code (e.g., choose headers and start spacing based on load requirements, add triple studs to support second stories, etc.). In some embodiments, the intelligent construction structure planner further optimizes a cost function that allows users to prioritize different aspects of the building during the automated panelization process. In some embodiments, the intelligent construction structure planner also integrates features to assist with later steps in the structure-building process, such as pre-cut holes for electrical wiring, integrating with plumbing requirements, and integrating with HVAC requirements, all of which can be done without requiring additional inputs from designers.

In some embodiments, the intelligent construction structure planner designs panels that can be prefabricated only through automated means, such as robotic builders. That is, when designing the panels, the intelligent construction structure planner also takes into consideration the fabrication principles and capacity of the automated robotic builders. In addition, the intelligent construction structure planner outputs the panel design in the form of commands or instructions that can be taken by the robotic builders for the automated fabrication of the designed panels. In some embodiments, the intelligent construction structure planner takes additional factors into consideration in the automated design process. For example, the designed panels may have a maximal width that falls within a range of packages that can be loaded and shipped to construction sites.

In some embodiments, the intelligent construction structure planner is configured to further generate a series of outputs for the designed panels. In one example, the intelligent construction structure planner generates a set of instructions or commands that can be output to the robotic builders for automated fabrication of the designed panels without requiring additional user inputs to provide parameters for fabrication purposes. In another example, the intelligent construction structure planner also generates a series of visual outputs that can be read by humans to verify the construction of panels and understand how to arrange the panels to assemble the panels in the construction sites.

In some embodiments, the intelligent construction structure planner can take an architectural plan in different forms as input when automatically generating the panel designs. For example, the intelligent construction structure planner can take an architectural plan in a portable document format (PDF), in a DWG format (a native format for several CAD packages including DraftSight, AutoCAD, ZWCAD, IntelliCAD (and its variants), Caddie and Open Design Alliance compliant applications), or even take an architectural plan in a traditional hard copy, which can be converted into an electronic copy for further processing in the automated panel design. In some embodiments, the intelligent construction structure planner can implement additional functions, as will be described in detail later.

The intelligent construction structure planner disclosed herein shows technical improvements when compared to other existing panel design software tools or products. First, the intelligent construction structure planner can automate the panel design process to automatically generate a list of panels directly from an architectural plan, without requiring experienced designers to provide inputs in the panel design process. This improves the functionalities of the current panel design software tools or products that serve merely as accounting or visualization tools. Second, the designed panels can be generated in the form of commands and instructions that can be directly output to the robotic builders for automatic fabrication of the designed panels, and thus the whole panel design and fabrication process can be totally automated. Third, the intelligent construction structure planner can take various forms of architectural plans as input, which further improves the capacity of the planner to handle the input documents in the automated panelization process.

It is to be noted that the benefits and advantages described herein are not all-inclusive, and many additional features and advantages will be further described under the context of specific embodiments. In addition, some additional features and advantages will become apparent to one of ordinary skill in the art in view of the figures and the following descriptions.

FIG. 1 is a block diagram of an example intelligent construction structure design and fabrication system 100, according to embodiments of the disclosure. According to some embodiments, the intelligent construction structure design and fabrication system 100 is a network-based specialized computer environment for automated intelligent construction structure design and fabrication. In one example, the intelligent construction structure design and fabrication system 100 as a whole merely takes an architectural plan as an input and is capable of automatically fabricating a set of construction structures such as wall panels as an output for the system 100. The set of construction structures, once fabricated, can be stacked and delivered to a construction site to erect the building structure. In the following descriptions, the intelligent construction structure design and fabrication system 100 will be described in detail with reference to panel design and fabrication (such as wall panels), however, the intelligent construction structure design and fabrication system 100 is not limited to panels, but can be applied to other different construction structures.

Referring to FIG. 1, the intelligent construction structure design and fabrication system 100 may include one or more user devices 103a . . . 103n (together or individually referred to as "user device 103"), an intelligent design system 101, and a robotic builder 115. In some embodiments, the intelligent construction structure design and fabrication system 100 may optionally further include an attached data store 113 that is accessible by various components included in the system. In some embodiments, all of these system components are configured for mutual communications. In the illustrated embodiment, the components 101, 103, 113, and 115 are configured to communicate through a network 111, as illustrated in FIG. 1. Examples of suitable network 111 include but are not limited to the Internet, a personal area network, a local area network (LAN), a wide area network (WAN), or a wireless local area network (WLAN).

In some embodiments, the user device 103 can be a specialized computer or another type of electronic device that is configured to provide user interfaces for uploading architectural plans, for visual presentation of panel designs, for inputting certain parameters related to the panel designs, among other possible functions related to the panel design and/or fabrication. In some embodiments, each user device 103 optionally includes an instance of intelligent construction structure planner 107a or 107n stored in memory 105a or 105n, where each instance of intelligent construction structure planner may be configured to perform partial or full functions related to construction structure design and/or fabrication. The specific functions implemented by each user device 103 may depend on whether the user device is associated with an architect, designer, builder, inspector, etc.

In some embodiments, a user device 103 may be a part of distributed computing topology, in which data collection and early stages of data processing are implemented close to the sites where tasks, events, or activities associated with the data occur. Distributed computing topology brings certain early stages of processing to the devices where it's being gathered, rather than relying all on a central location (e.g., intelligent design system 101, which can be a backend server). In one example, a user device 103 may be a remote device that receives an architectural plan, which may be a physical copy (e.g., a scanned copy or a photo taken from the physical copy). The user device 103 may convert the received physical copy into an electronic copy, which can be then transmitted to the intelligent design system or sever 101 for automated panel design.

The intelligent design system 101 may be configured to analyze an architectural plan and determine a project, based at least in part, on the architectural plan. By way of example and not limitation, the architectural plan can be in the form of electronic data, such as a portable document format (PDF) file or a DWG file. In some embodiments, the architectural plan can be a two-dimensional floor plan that presents the to-be-constructed building in a graphic view. In some embodiments, the architectural plan can also include other information related to the construction, such as building code(s). In some embodiments, the architectural plan can be a scanned copy or a photo taken from a physical architectural plan.

In some embodiments, the intelligent design system 101 can be formed from hardware, software, or any combination thereof. In one embodiment, the intelligent design system can be implemented as a stand-alone system comprising one or more processors for processing the electronic data encompassing the architectural plan. For example, the intelligent design system can be in the form of software installed on a computer or web-based software (e.g., a website, etc.). In another example, the software can receive and process a PDF file that includes an architectural plan to determine one or more criteria (e.g., a floor plan, a wall elevation, etc.) for constructing a building structure. In a specific example, the PDF file is optically read and analyzed to determine the criteria and/or parameters for constructing the building structure.

In some embodiments, the intelligent design system 101 may also process a conventional plan to generate a component design plan, which includes a strategy for designing components of the building structure (e.g., panels to form a wall, etc.). Parameters and heuristics for designing the components use rules from a building code, which may be part of the architectural plan. For example, the intelligent design system 101 may include logic or algorithm(s) that are configured to generate the construction details based on the architectural plan. The construction details may include but are not limited to framing components (e.g., walls), roof, pipeline equipment, electronic power, piping system, fixed equipment (e.g., cabinets), lighting system, etc. In one specific example, the intelligent design system 101 may automatically identify an exterior wall from the architectural plan, as will be described in detail later. In some embodiments, components included in a panel or building can be identified by the disclosed intelligent design system through image processing, similar to the identification of exterior walls described later.

In some embodiments, based on the construction details converted from the architectural plan, the intelligent design system 101 may further design a list of panels to be constructed, which takes into consideration framing information (e.g., wall information) as well as other construction structure information such as piping and electronic wiring information as described above. In some embodiments, the intelligent design system 101 further generates a set of commands and instructions that carry the specifications of the designed panels, which are then sent to the robotic builder 115 for off-site prefabrication of the designed panels, as described elsewhere herein.

The robotic builder 115 includes one or more robotic machines that are configured to construct unique and special structures with features of high complexity, high mix, and low volume, and are proven with high degrees of versatility, diversity, and flexibility to perform fabrication and/or construction projects. The robotic machines may be equipped with one or more end effectors to mount and/or connect tools (e.g., a gripper, a drill, a cutter, etc.) that are used during the automated wall panel fabrication process. In some embodiments, the robotic machines are pre-programmed with sequences of specific motion commands and commands for other operations in order to cause the robotic devices to complete the wall panel fabrication process. In some embodiments, when the intelligent design system 101 generates the commands or instructions for the designed panels, the design system may look into the pre-programmed commands included in the robotic builder 115, and generate one or more commands and instructions that the robotic builder 115 can understand and follow during the panel fabrication process. In one example, the robotic builder 115 optionally includes an instruction processing unit 117 that is configured to identify specific parameters or variables for the to-be-constructed panels from the panel design.

In some embodiments, besides the user device(s) 103, the intelligent design system 101, and the robotic builder 115, the disclosed intelligent construction structure design and fabrication system 100 may include additional components or units not described above. In one example, the system 100 may include one or more data stores, such as data store 109 and attached data store 113, that can be attached to a specific component or can be accessible through the internet by more than one component included in the system 100. These data stores may store architectural plans and generated panel designs, among other data generated or required during the panel design and fabrication processes.

Figure 2:
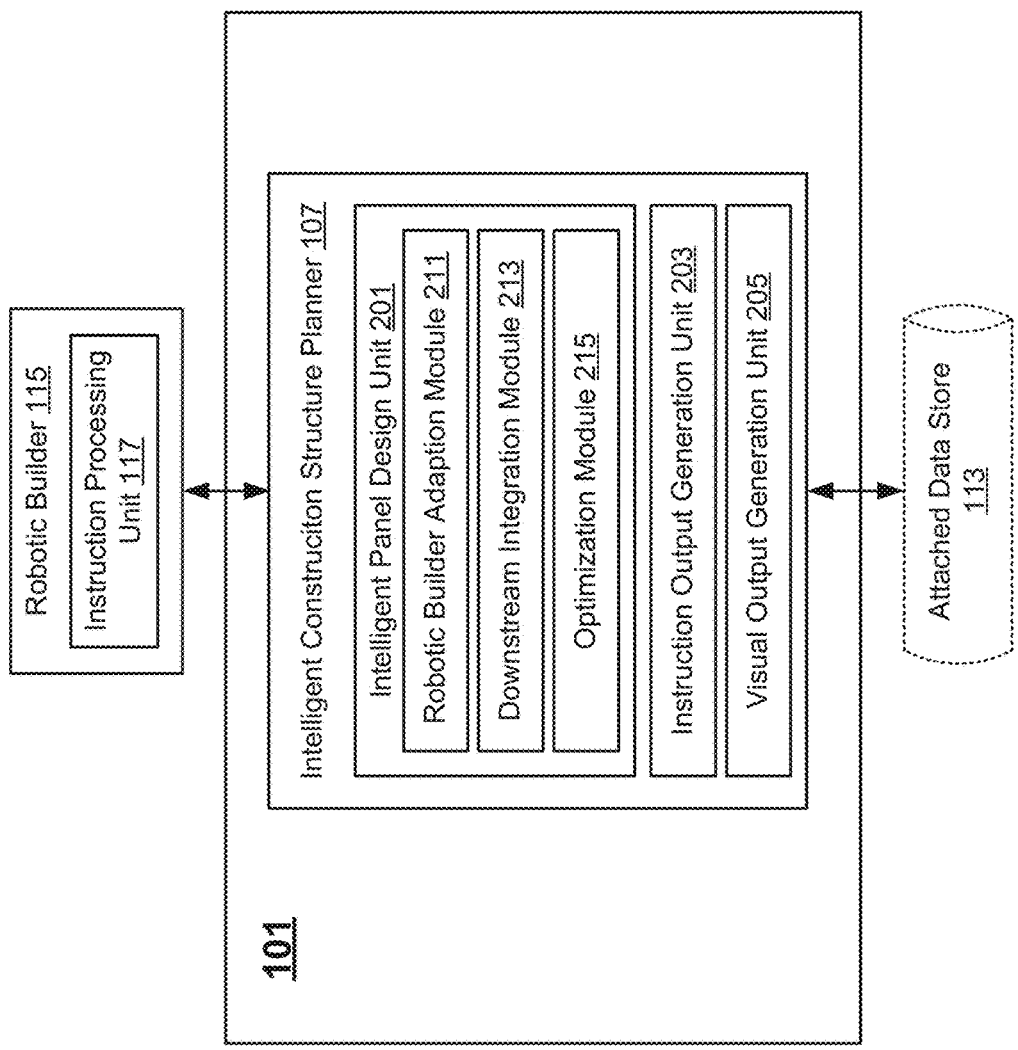
FIG. 2 illustrates example components included in an intelligent construction structure planner, according to embodiments of the disclosure.

Referring now to FIG. 2, an exemplary configuration of the intelligent design system or server 101 is further described. As illustrated in FIG. 1, the intelligent design system 101 includes an intelligent construction design planner 107o configured to design a set of panels for a to-be-constructed building. In one example, the intelligent construction design planner 107 may include an intelligent panel design unit 201 to achieve such functions. Specifically, the intelligent panel design unit 201 may include logic and programs configured to convert a traditional architectural plan for a building into a panelized system plan that includes a set of panels for the building, as briefly described earlier in FIG. 1 and as further described in detail below.

According to one embodiment, to convert a two-dimensional or three-dimensional architectural plan into a set of designed panels, the intelligent panel design unit 201 may be configured to first create a two-dimensional modified panel design. Specifically, the intelligent panel design unit 201 may first identify the framing information including the perimeter walls of the structure, such as the location, length, and type of every wall in the structure to be built. In some embodiments, the intelligent panel design unit 201 may configure a predefined panel size (also referred to as standard panel) during the panel design, and generate a set of designed panels by using the standard size. In some embodiments, customized panels may be generated instead. In some embodiments, a panel may be dynamically designed through an optimized approach, as will be described in more detail below. In some embodiments, the framing information may be written in yet another markup language (YAML) during the conversion process. YAML is commonly used for configuration files and in applications where data is being stored or transmitted.

In one example using the standard panel approach, the intelligent panel design unit 201 identifies sections of the walls that include a door or window. If it is found that a section of a wall that includes a door or window fits within the dimensions of a standard panel (which can be predefined according to the current practice in the construction industry), then that section of the wall is replaced with a representation of a standard panel having a window or door element corresponding to the door or window for that section of the wall. If it is found that a section of the wall that includes a door or window does not fit within the dimensions of a standard panel, the intelligent panel design unit 201 may generate one or more customized panels including a window or wall for that section of the wall. In this way, the panels for the wall sections that include a door or window are first designed. In some embodiments, after the panels for the sections of the walls that include a door or window are designed, the intelligent panel design unit 201 may generate the remaining sections of the wall by using a standard panel or using panels determined or customized through different means, as further described in detail below.

In some embodiments, when designing the set of panels, the intelligent panel design unit 201 may take many additional factors into consideration in the design process. In one example, the intelligent panel design unit 201 may take into consideration the capacity of the downstream robotic builder 115. Specifically, a robotic builder adaption module 211 may be included in the intelligent panel design unit 201, which may include logic or algorithm(s) configured to inspect the capacity of the robotic builder 115 before designing the panels. For example, the maximum weight and size of a panel that the robotic builder 115 can handle or fabricate are first checked. In addition, which tools are included in the robotic builder 115 are also checked. In this way, when designing the panels, it can be ensured that the designed panels are capable of being fabricated through the downstream robotic builder 115. For example, when defining the aforementioned standard panels, the robotic builder adaption module 211 may determine the size of the standard panel by taking into consideration the capacity of the robotic builder 115.

In some embodiments, the intelligent panel design unit 201 may also include a downstream integration module 213 that is configured to integrate features to assist with later steps in the structure-building process, such as pre-cut holes for electrical wiring, integration with plumbing requirements, integration with HVAC requirements, etc. In other words, during the design process, the intelligent panel design unit 201 may be also configured to adjust the size of a panel to ensure that the features assisting with later steps in the structure-building process are also considered. In one example, the intelligent panel design unit 201 may keep the pre-cut holes away from the edges of a designed panel by adjusting the size of a designed panel. Other adjustments are also possible.

In some embodiments, the intelligent panel design unit 201 may additionally include an optimization module 215 configured to optimize the designed panels by taking into consideration cost, among other possible factors. Briefly, when designing the panels, the intelligent panel design unit 201 may minimize the cost (including minimizing the cutting time and waste materials) and respect the constraints of the designed panels. The specific functions of the optimization module 215 are further described later in FIGS. 3 and 4.

Referring again to FIG. 2, in some embodiments, the intelligent construction structure planner 107 may further include an instruction output generation unit 203 and a visual output generation unit 205. The instruction output generation unit 203 may be configured to generate a set of instructions or commands that allow the automated robotic builder 115 to build the panels according to the input panel design. The instructions may be generated in a YAML format (or python-format) that the robotic builder 115 can read and further extract the information (which can be in the form of variables used in the robot framework) from the instructions for fabrication of the designed panels.

The visual output generation unit 205 may be configured to generate a "panel book," which is a visual representation of the panelized house and contains all the information detailing the panels. The panel book can be used by humans to verify panels after they are built by the robotic builders, and is provided to framers so that they know how to assemble the panels together.

As described earlier, in some embodiments, instead of using standard panels in the panel design process, the panel design process is dynamically optimized through additional logic or algorithm(s) included in the intelligent construction structure planner 107. In one example, in order to design panels that are optimal with respect to some cost function, dynamic programming (DP) is employed.

Referring to FIG. 3, an exemplary algorithm for optimizing the panel design is further illustrated. Briefly, the algorithm may start by discretizing the wall into chunks of length dx. It then loops from the beginning of the wall to the end of the wall, calculating the cost of the optimal set of panel splits ending at each point and filling in the cost of the optimal set of panels OPT[ ]. To calculate the optimal panel splits, at each step, a decision is made about the panel ending at point j. The length of this panel is between max_len and min_len. The earliest that the panel ending at j can start is max_len left of j, and the latest that can start is min_len left of j. Accordingly, if optimal solutions up to j−1 are known, the algorithm can pick the next optimal solution by taking the minimal cost of all potential panel lengths. The cost of having a panel starting at i and ending at j is the cost of the optimal set of panels ending at i (e.g., OPT [i]) plus the cost of a panel between i and j (e.g., cost (i, j)). With this, the algorithm finds optimal solutions up to point j while j is swept from left to right along the wall.

Figure 4:
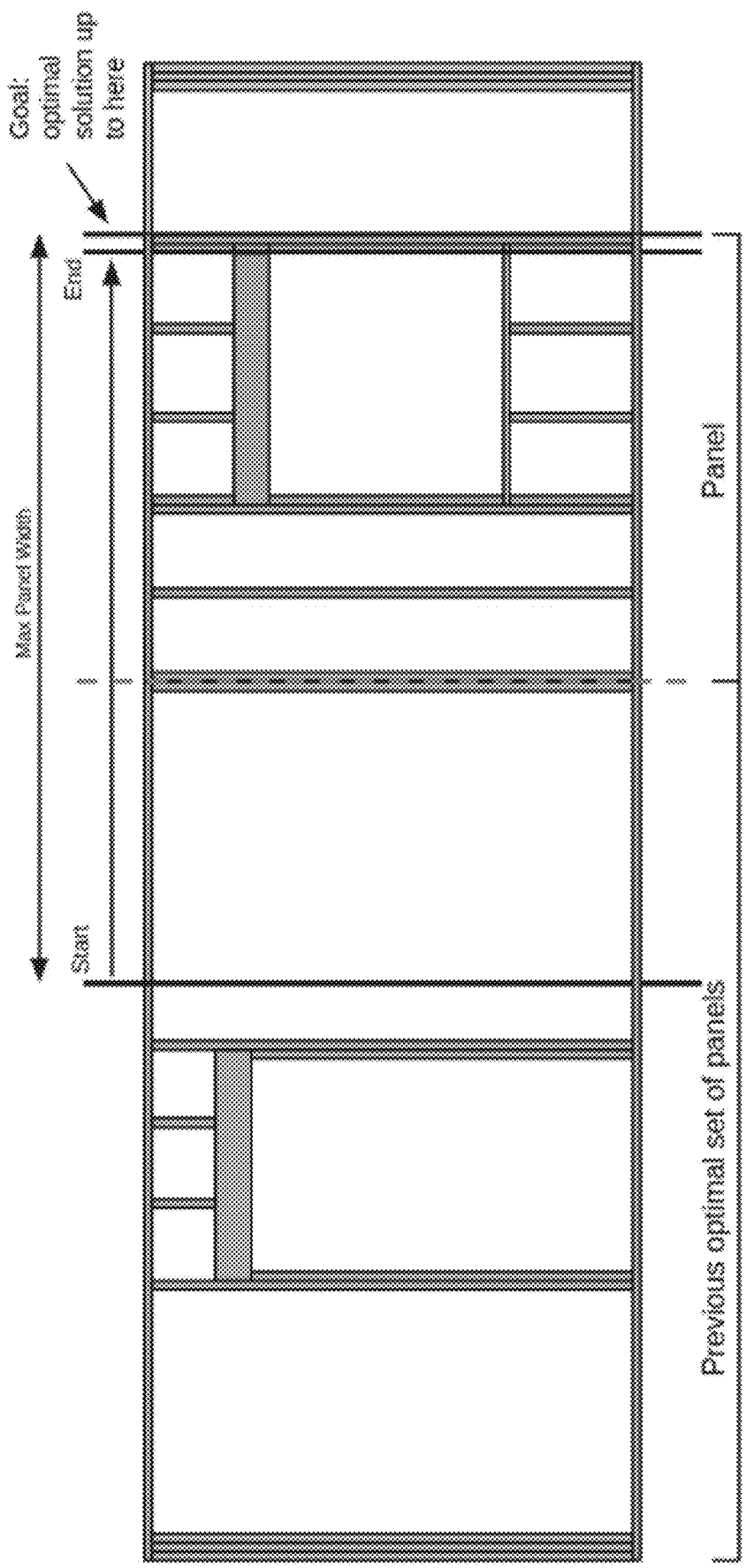
FIG. 4 illustrates an example image showing one step of the algorithm for optimizing the panel design, according to embodiments of the disclosure.

FIG. 4 illustrates an example image showing one step of the algorithm for optimizing the panel design. The algorithm is searching for an optimal solution up to the labeled point on the right and has already identified the optimal solution for all the points prior to the labeled point. The labeled point corresponds to j in the algorithm. Because the point at which the panel ends and the panel's length bounds are known, it is possible to check for panels starting between the points labeled "Start" and "End." The dotted line corresponds to i in the algorithm, and is being swept from the Start to End. For each location of the dotted line, the algorithm looks at OPT[i] to get the cost of an optimal set of panels ending at i, and calculates cost (i, j) to get the cost of a panel between points i and j. The algorithm subsequently sums these two numbers (e.g., OPT[i]+cost(i, j)) for each location of the dotted line (i) between Start and End, and picks the location for i with the lowest overall cost. Afterward, OPT[j] is set to this minimum cost, and j is incremented by 1. The process repeats until the end of the wall is reached (e.g., when j=i) and the optimal set of panels for the entire wall has been selected.

In some embodiments, the goal of the intelligent panel design unit's cost function is to encourage "good" panels by assigning a score to every potential panel. The function returns larger values for "worse" panels and lower values for "better" panels. The cost function can be designed to choose panels that minimize wood cost, encourage large panels, and also minimize the number of panels. The cost function and its components are shown below.

$$\text{Cost} = C \cdot \text{panel\_size\_cost} + \text{panel\_cost}$$

As shown above, the cost function, Cost, for each panel has two components: the cost of the panel due to its size (e.g., the cost of the panel material per unit length; panel_size_cost) and the cost associated with the panel's construction (e.g., panel_cost). The panel size cost is a scaled and shifted sigmoid function of the difference between the panel's maximum length (e.g., max_panel_length) and the panel's actual size (e.g., panel_length) normalized to a value between zero and one. In some embodiments, the sigmoid function representing the panel size cost is selected so that its shape is indicative of panels that require attention and/or adjustments. For example, for a panel that is already at 90% of its maximum length, the sigmoid is substantially flat indicating that it is not critical to make further changes to the length of the panel (e.g., to make the panel larger). On the other hand, for a panel that is quite small (e.g., about 50% of its maximum length or less), the sigmoid becomes steep indicating that it is critical for the panel to be made larger. This allows the algorithm to quickly identify panels where the sigmoid is steep and panel length adjustments are necessary to reduce the overall cost.

The panel cost has three main components. Namely, the number of studs, the cost associated with cutting the sheathing, and error costs. The number of studs is the number of full-length studs added to the panel. The studs can be regular studs or any kind of studs used to build, for example, windows and doors. The shipping cost is calculated by multiplying the cut cost by the number of cuts needed for sheathing. The shipping cost is incorporated into the cost function because cutting the sheathing with a robotic means can be difficult. It is therefore preferred that the panels are selected with as many full pieces of sheathing as possible. Error costs are added to the cost of the panel if a particular erroneous fact is true about the panel. By way of example and not limitation, this may occur in three scenarios: when an object, like a door or window, is unable to be built; when a ladder blocking is unable to be placed where required; and when there are flat pieces of wood on both sides of the panel, front and back.

In some embodiments, the intelligent construction structure planner 107 uses the dynamic program described above to create panels for each wall. For example, when actually running a set of architectural plans, a dynamic program (e.g., a BuildGenerator object) for generating a wall component is created for the set of architectural plans, which then creates an object (e.g., a PanelGenerator object) for generating a set of panels for each wall.

In some embodiments, a method containing the DP implementation may be employed in the panel generation. In some embodiments, in the DP implementation, dx is the distance that is used to discretize over the length of the wall, and "costs" is the costs array for use in the DP algorithm. "Costs" may be created with a costs array creation method called make_costs_array and represent the minimum cost to build a wall up to the corresponding point along the discretized wall. This point is the index of a spot in the array times dx, the discretization factor. The base case has the zeroth entry of the array equal to zero, and infinity where it is impossible to begin or end a wall. In the DP implementation disclosed herein, there is an array of Panel objects referred to as panel_solutions, which has the same length as costs. The array of Panel objects contain the panel ending at the corresponding point that is a part of the optimal solution. In addition, there is an array of integers referred to as prev_subproblems, which have the same length as costs. It contains the index of the solution to the previous subproblem. In this algorithm, this is the start location of the panel that ends at the current location, in the optimal solution. For example, if there is a 7-foot wall split into 3 panels at 2 and 4 feet from the left, there are three panels with the respective lengths of 2, 2, and 3 feet. The value of the last element of prev_subproblems will be the index that corresponds to 4 feet from the left, since the optimal solution up to 4 feet is the previous subproblem to the panel between 4 and 7 feet. The value of prev_subproblems at the index of 4 feet will be the index of 2 feet from the left, and at the index of 2 feet, it will be zero. These are used to get the panels that construct the optimal solution, by looking at the last element and tracing back.

Referring back to FIG. 2, after generating the panel designs, a set of instructions or commands may be sent to the robotic builder 115 for building the designed panels, for example, processed through the instruction processing unit 117 included therein. In some embodiments, all codes that deal with the actual construction of panels are held in a set of pythons referred to as build_manager.py and builder.py. These codes or pythons may be a part of the instruction processing unit 117 included in the robotic builder 115.

In some embodiments, building logic for panel construction is independent from the DP algorithm for panel design, so the DP algorithm used for the panel design may be changed or switched out without needing to deal with construction-specific building logic. In some embodiments, new building methods can be added and can be easily switched. In some embodiments, building methods should not incorrectly build something based on the environment around them. In one example, it will be incorrect to build a triple stud for a wall connection when it intersects a king stud right near it. In some embodiments, scenarios that cannot be built can be also detected.

In some embodiments, the building process is organized by using a build manager and a set of builders included in the robotic builder 115. The build manager provides methods for external code (such as the DP algorithm used by the intelligent panel design unit 201) to build panels based on wall specifications (e.g., WallSpec). Each of the set of builders is a subclass of Builder, and may implement a few methods. These implemented methods allow the build manager to know which type of ElementSpec each builder is able to build, allow the build manager to check if a builder can build an element, and let the build manager use the builder to actually build that element if it is able to. This modular design can keep logic for building different aspects of a wall in separate classes. It is easy to add new building logic, by subclassing Builder to implement the required methods. There can be multiple builders for each ElementSpec type, where the first one that can_build an ElementSpec object may be chosen. In some embodiments, the disclosed algorithm may also allow to expand the building logic to include costs, which then allows to choose builders based on cost.

In some embodiments, the method disclosed herein also allows the program to detect which elements were unable to be built, by looking at the can_build method of each builder. Elements that were not built are stored in the unbuilt_elements attribute of Wall.

In some embodiments, the method disclosed herein also allows to add a new builder. In one example, a new builder class that subclasses Builder can be created. Specifically, build_type may be implemented to tell the build manager which type of ElementSpec this builder can build. Next, bounds may be implemented to return the left and right bounds of the built element. For example, for a door, this would be from the left side of the left king stud to the right side of the right king stud. Following that, a method can_build can be implemented. In some embodiments, there is a default implementation available in Builder. If default implementation is sufficient, do not implement this can_build method. Otherwise, override it and run the can_build method to return a result called CanBuildResult. In one example, a method called super( ).can_build( ) may be used in overriding implementation and then add additional logic. In some embodiments, when implementing the method called build, given an ElementSpec and a panel, the build uses the methods of that panel to build the element onto that panel.

In some embodiments, besides the above-described various algorithms in panel design (or generation), the disclosed intelligent construction structure planner may include additional algorithms. For example, for sheathing and other possible reasons, the disclosed intelligent construction structure planner disclosed herein may further include logic or algorithm(s) for the detection of exterior structures from an architectural plan. Here, detecting the exterior of a structure (e.g., of a house) refers to finding the walls and/or sections of the walls that are on the exterior side of the structure. Exterior detection is critical for knowing which panels to apply sheathing to, setting rough opening sizes based on whether a panel is in an exterior or interior wall, and numbering panels in the panel book starting around the outside.

In one example, the logic or algorithm first creates a graph of all the lines along walls. It then finds the point at the end of a line that is the most left, and then the most down. This is the starting point of the search. The second point is a point connected to the first point by a line, that has the most vertical line. It then finds point after point, tracing around the outside of the house clockwise. The next point selected is the one connected to the previous point that has the smallest angle clockwise from the previous line to the new line.

In some embodiments, walls can be either exterior, interior, or both. Exterior walls have no common surfaces with the interior surfaces of the building and interior walls have no common surfaces with the exterior surfaces of the building. On the other hand, some walls are partially exterior and partially interior. In some embodiments, the information for the exterior walls can be taken into consideration in the automated panel design.

Figure 5:
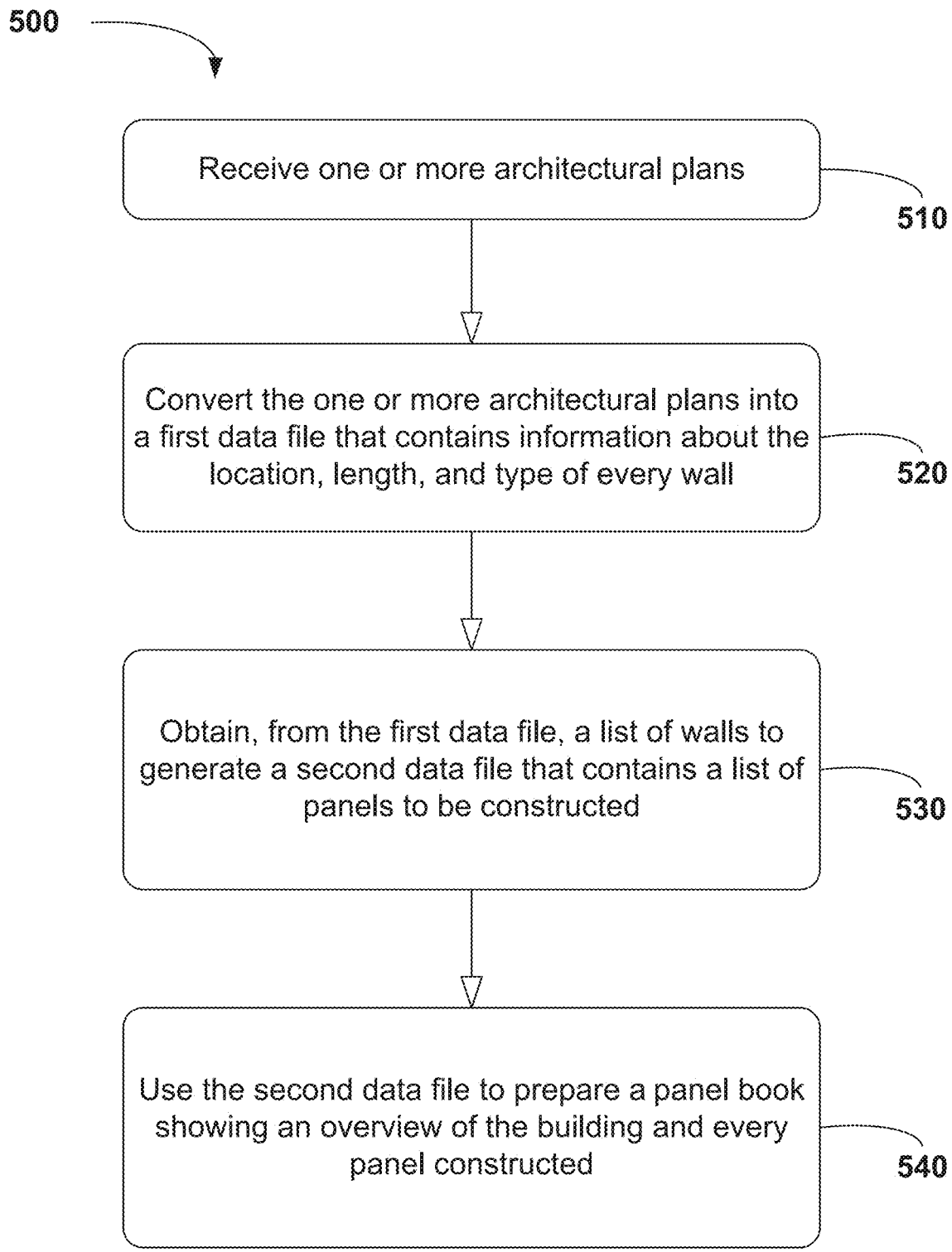
FIG. 5 is a flow chart of an example method for automatic panel design and fabrication, according to embodiments of the disclosure.

Referring now to FIG. 5, a flow chart of a method 500 for performing the aforementioned operations is further illustrated. Other operations may be performed between the various operations of method 500 and may be omitted merely for clarity. This present disclosure is not limited to this operational description. It is to be noted that additional operations may be performed. Moreover, not all operations may be needed to perform the disclosure provided herein. Additionally, some or all of the operations may be performed simultaneously, substantially at the same time, or in a different order than that shown in FIG. 5. In some embodiments, one or more other operations may be performed in addition to or in place of the presently described operations.

Method 500 begins with operation 510 where the intelligent design system receives one or more architectural plans. As discussed above, the architectural plans can be in electronic form, such as in PDF or DWG files, scanned or imaged documents, etc. The architectural plans can be a two-dimensional floor plan, for example, a technical drawing to scale, showing a view from above, of the relationships between rooms, spaces, traffic patterns, and other physical features at one or multiple levels of a structure. The architectural plans may contain structural information about the structure to be built, such as the relative location of building components, etc. The architectural plans may be uploaded to the intelligent design system (which may be installed and operated from a personal computer device or from a server device that is local or remote) via conventional methods, such as via a network connection, from a hard drive or a solid-state drive (e.g., a USB drive), and the like. By way of example and not limitation, the intelligent design system is configured to optically read and analyze the architectural plans to determine one or more criteria (e.g., a floor plan, a wall elevation, etc.) for constructing the building structure.

Method 500 continues with operation 520 where the intelligent design system converts one or more architectural plans into a first data file that contains information about the location, length, and type of every wall in the structure to be built. By way of example and not limitation, the first data file may be written in YAML markup language, which is commonly used for configuration files and in applications where data is being stored or transmitted. Intelligent design systems may also use other suitable markup languages for the conversion of the architectural plans to the first data file. In some embodiments, some aspects of the conversion in operation 520 may be partially performed automatically by the intelligent design system software while other aspects of the conversion in operation 520 may be performed via manual programming methods.

Method 500 continues with operation 530 in which the intelligent design system uses the list of walls from the first data file to generate a second data file (e.g., an output data file) that contains the list of the designed panels to be constructed. According to some embodiments, the second data file (e.g., the output data file) also contains building instructions or commands for the robotic builders to build the designed panels. In addition, in some embodiments, the second data file may also include an data object related to the whole building. The data object may include specifications for that building, such as information for manufacturing each of the list of panels, including a location and a type of each lumber used for manufacturing cach of the list of panels, and one or more fasteners for holding lumbers for each of the list of panels. By way of example and not limitation, the second data file may also be a YAML file or another type of markup file.

While not illustrated, in some embodiments, Method 500 further includes an operation to communicate with a robotic builder to send instructions or commands to the robotic builder. Upon receipt of the commands or instructions, the robotic builder automatically and sequentially fabricates the list of panels.

Method 500 continues with operation 540 in which the intelligent design system uses the second data file to prepare a panel book containing an overview of the building and every panel constructed. As discussed above, the panel book contains instructions for humans on how to verify and assemble the panels at the construction site.

In some embodiments, the panels are numbered in the panel book to assist with the assembly. The panels can be numbered in any convenient way. For example, panel numbering may start with the exterior panels (e.g., in a clockwise fashion) and continue with panels in cach room (e.g., in a clockwise fashion).

Figure 6:
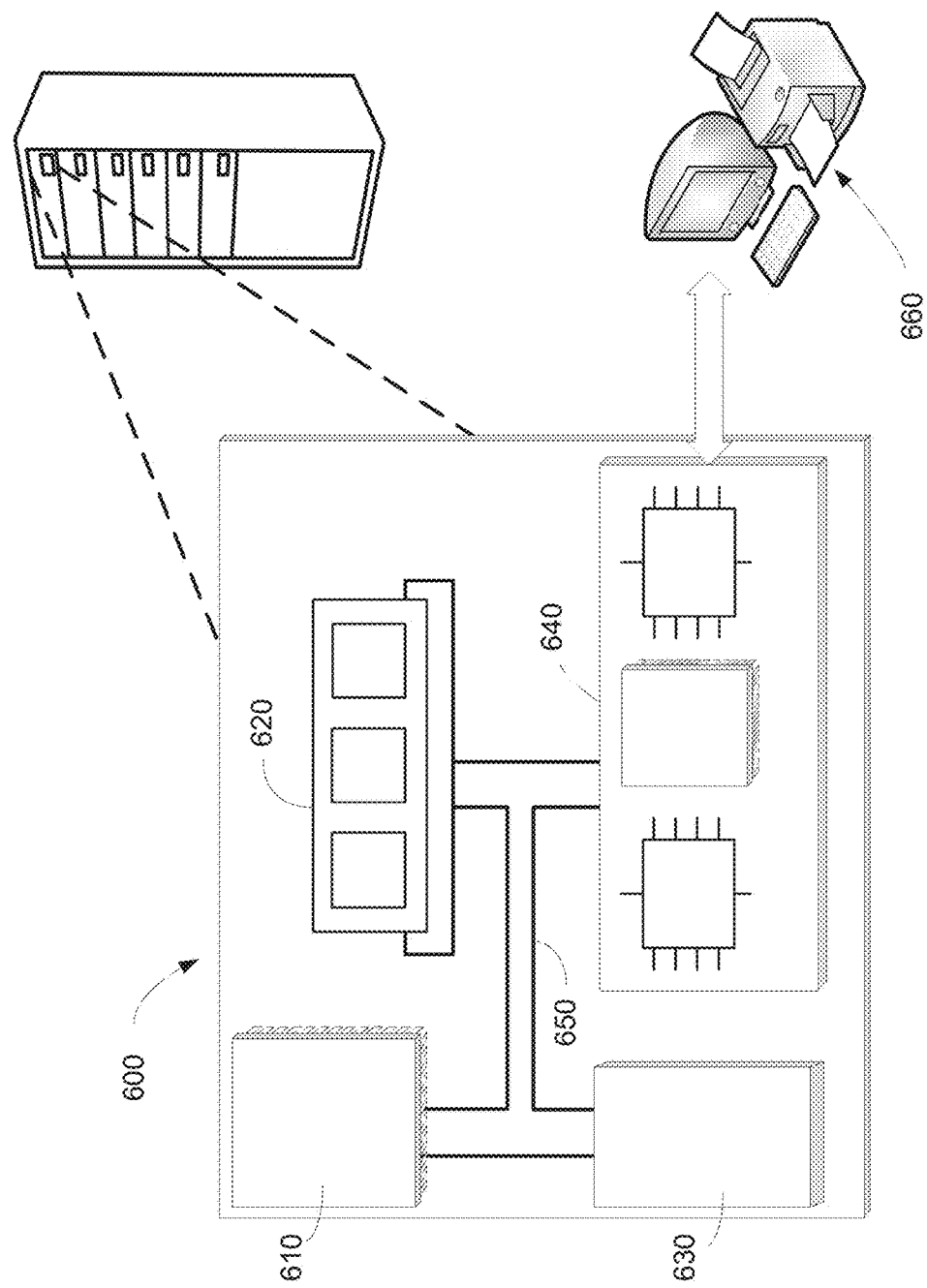
FIG. 6 is a block diagram of an example computer for an intelligent construction structure design and fabrication system, according to embodiments of the disclosure.

FIG. 6 is a block diagram of an example computer system 600 that may be used in implementing the technology described in this document. General-purpose computers, network appliances, mobile devices, or other electronic systems may also include at least portions of the system 600. The system 600 includes a processor 610, a memory 620, a storage device 630, and an input/output device 640. Each of the components 610, 620, 630, and 640 may be interconnected, for example, using a system bus 650. The processor 610 is capable of processing instructions for execution within the system 600. In some implementations, the processor 610 is a single-threaded processor. In some implementations, the processor 610 is a multi-threaded processor. The processor 610 is capable of processing instructions stored in the memory 620 or on the storage device 630.

The memory 620 stores information within the system 600. In some implementations, the memory 620 is a non-transitory computer-readable medium. In some implementations, the memory 620 is a volatile memory unit. In some implementations, the memory 620 is a non-volatile memory unit.

The storage device 630 is capable of providing mass storage for the system 600. In some implementations, the storage device 630 is a non-transitory computer-readable medium. In various different implementations, the storage device 630 may include, for example, a hard disk device, an optical disk device, a solid-date drive, a flash drive, or some other large capacity storage device. For example, the storage device may store long-term data (e.g., database data, file system data, etc.). The input/output device 640 provides input/output operations for the system 600. In some implementations, the input/output device 640 may include one or more of a network interface devices, e.g., an Ethernet card, a serial communication device, e.g., an RS-232 port, and/or a wireless interface device, e.g., an 802.11 card, a 3G wireless modem, or a 4G wireless modem. In some implementations, the input/output device may include driver devices configured to receive input data and send output data to other input/output devices, e.g., keyboard, printer and display devices 660. In some examples, mobile computing devices, mobile communication devices, and other devices may be used.

In some implementations, at least a portion of the approaches described above may be realized by instructions that upon execution cause one or more processing devices to carry out the processes and functions described above. Such instructions may include, for example, interpreted instructions such as script instructions, or executable code, or other instructions stored in a non-transitory computer readable medium. The storage device 630 may be implemented in a distributed way over a network, for example as a server farm or a set of widely distributed servers, or may be implemented in a single computing device.

Although an example processing system has been described in FIG. 6, embodiments of the subject matter, functional operations and processes described in this specification can be implemented in other types of digital electronic circuitry, in tangibly-embodied computer software or firmware, in computer hardware, including the structures disclosed in this specification and their structural equivalents, or in combinations of one or more of them. Embodiments of the subject matter described in this specification can be implemented as one or more computer programs, i.e., one or more modules of computer program instructions encoded on a tangible nonvolatile program carrier for execution by, or to control the operation of, data processing apparatus. Alternatively or in addition, the program instructions can be encoded on an artificially generated propagated signal, e.g., a machine-generated electrical, optical, or electromagnetic signal that is generated to encode information for transmission to suitable receiver apparatus for execution by a data processing apparatus. The computer storage medium can be a machine-readable storage device, a machine-readable storage substrate, a random or serial access memory device, or a combination of one or more of them.

The term "system" may encompass all kinds of apparatus, devices, and machines for processing data, including by way of example a programmable processor, a computer, or multiple processors or computers. A processing system may include special purpose logic circuitry, e.g., an FPGA (field programmable gate array) or an ASIC (application specific integrated circuit). A processing system may include, in addition to hardware, code that creates an execution environment for the computer program in question, e.g., code that constitutes processor firmware, a protocol stack, a database management system, an operating system, or a combination of one or more of them.

A computer program (which may also be referred to or described as a program, software, a software application, a module, a software module, a script, or code) can be written in any form of programming language, including compiled or interpreted languages, or declarative or procedural languages, and it can be deployed in any form, including as a standalone program or as a module, component, subroutine, or other unit suitable for use in a computing environment. A computer program may, but need not, correspond to a file in a file system. A program can be stored in a portion of a file that holds other programs or data (e.g., one or more scripts stored in a markup language document), in a single file dedicated to the program in question, or in multiple coordinated files (e.g., files that store one or more modules, sub programs, or portions of code). A computer program can be deployed to be executed on one computer or on multiple computers that are located at one site or distributed across multiple sites and interconnected by a communication network.

The processes and logic flows described in this specification can be performed by one or more programmable computers executing one or more computer programs to perform functions by operating on input data and generating output. The processes and logic flows can also be performed by, and apparatus can also be implemented as, special purpose logic circuitry, e.g., an FPGA (field programmable gate array) or an ASIC (application specific integrated circuit).

Computers suitable for the execution of a computer program can include, by way of example, general or special purpose microprocessors or both, or any other kind of central processing unit. Generally, a central processing unit will receive instructions and data from a read-only memory or a random access memory or both. A computer generally includes a central processing unit for performing or executing instructions and one or more memory devices for storing instructions and data. Generally, a computer will also include, or be operatively coupled to receive data from or transfer data to, or both, one or more mass storage devices for storing data, e.g., magnetic, magneto optical disks, or optical disks. However, a computer need not have such devices. Moreover, a computer can be embedded in another device, e.g., a mobile telephone, a personal digital assistant (PDA), a mobile audio or video player, a game console, a Global Positioning System (GPS) receiver, or a portable storage device (e.g., a universal serial bus (USB) flash drive), to name just a few.

Computer readable media suitable for storing computer program instructions and data include all forms of nonvolatile memory, media and memory devices, including by way of example semiconductor memory devices, e.g., EPROM, EEPROM, and flash memory devices; magnetic disks, e.g., internal hard disks or removable disks; magneto optical disks; and CD-ROM and DVD-ROM disks. The processor and the memory can be supplemented by, or incorporated in, special purpose logic circuitry.

To provide for interaction with a user, embodiments of the subject matter described in this specification can be implemented on a computer having a display device, e.g., a CRT (cathode ray tube) or LCD (liquid crystal display) monitor, for displaying information to the user and a keyboard and a pointing device, e.g., a mouse or a trackball, by which the user can provide input to the computer. Other kinds of devices can be used to provide for interaction with a user as well; for example, feedback provided to the user can be any form of sensory feedback, e.g., visual feedback, auditory feedback, or tactile feedback; and input from the user can be received in any form, including acoustic, speech, or tactile input. In addition, a computer can interact with a user by sending documents to and receiving documents from a device that is used by the user; for example, by sending web pages to a web browser on a user's user device in response to requests received from the web browser.

Embodiments of the subject matter described in this specification can be implemented in a computing system that includes a back end component, e.g., as a data server, or that includes a middleware component, e.g., an application server, or that includes a front end component, e.g., a client computer having a graphical user interface or a Web browser through which a user can interact with an implementation of the subject matter described in this specification, or any combination of one or more such back end, middleware, or front end components. The components of the system can be interconnected by any form or medium of digital data communication, e.g., a communication network. Examples of communication networks include LAN and WAN, e.g., the Internet.

The computing system can include clients and servers. A client and server are generally remote from each other and typically interact through a communication network. The relationship of client and server arises by virtue of computer programs running on the respective computers and having a client-server relationship to each other.

While this specification contains many specific implementation details, these should not be construed as limitations on the scope of what may be claimed, but rather as descriptions of features that may be specific to particular embodiments. Certain features that are described in this specification in the context of separate embodiments can also be implemented in combination in a single embodiment. Conversely, various features that are described in the context of a single embodiment can also be implemented in multiple embodiments separately or in any suitable subcombination. Moreover, although features may be described above as acting in certain combinations and even initially claimed as such, one or more features from a claimed combination can in some cases be excised from the combination, and the claimed combination may be directed to a subcombination or variation of a subcombination.

Similarly, while operations are depicted in the drawings in a particular order, this should not be understood as requiring that such operations be performed in the particular order shown or in sequential order, or that all illustrated operations be performed, to achieve desirable results. In certain circumstances, multitasking and parallel processing may be advantageous. Moreover, the separation of various system components in the embodiments described above should not be understood as requiring such separation in all embodiments, and it should be understood that the described program components and systems can generally be integrated together in a single software product or packaged into multiple software products.

Particular embodiments of the subject matter have been described. Other embodiments are within the scope of the following claims. For example, the actions recited in the claims can be performed in a different order and still achieve desirable results. As one example, the processes depicted in the accompanying figures do not necessarily require the particular order shown, or sequential order, to achieve desirable results. In certain implementations, multitasking and parallel processing may be advantageous. Other steps or stages may be provided, or steps or stages may be eliminated, from the described processes. Accordingly, other implementations are within the scope of the following claims.

TERMINOLOGY

The phraseology and terminology used herein is for the purpose of description and should not be regarded as limiting.

Construction refers to the making or forming of an object (e.g., a building structure, a component of a building structure, etc.) by combining or arranging parts or elements of the object. A building structure is a stationary construction with a roof and walls, such as a house, a ware house, a factory, etc. For example, a plurality of walls and a roof can be used to form a residential building (e.g., a single family unit). A component of a building structure is a constituent part of the structure. For example, the wall panels used to form a wall are components of the wall.

Measurements, sizes, amounts, and the like may be presented herein in a range format. The description in range format is provided merely for convenience and brevity and should not be construed as an inflexible limitation on the scope of the invention. Accordingly, the description of a range should be considered to have specifically disclosed all the possible subranges as well as individual numerical values within that range. For example, description of a range such as 1-20 meters should be considered to have specifically disclosed subranges such as 1 meter, 2 meters, 1-2 meters, less than 2 meters, 10-11 meters, 10-12 meters, 10-13 meters, 10-14 meters, 11-12 meters, 11-13 meters, etc.

Furthermore, connections between components or systems within the figures are not intended to be limited to direct connections. Rather, data or signals between these components may be modified, re-formatted, or otherwise changed by intermediary components. Also, additional or fewer connections may be used. The terms "coupled," "connected," or "communicatively coupled" shall be understood to include direct connections, indirect connections through one or more intermediary devices, wireless connections, and so forth.

The term "approximately", the phrase "approximately equal to", and other similar phrases, as used in the specification and the claims (e.g., "X has a value of approximately Y" or "X is approximately equal to Y"), should be understood to mean that one value (X) is within a predetermined range of another value (Y). The predetermined range may be plus or minus 20%, 10%, 5%, 3%, 1%, 0.1%, or less than 0.1%, unless otherwise indicated.

The indefinite articles "a" and "an," as used in the specification and in the claims, unless clearly indicated to the contrary, should be understood to mean "at least one." The phrase "and/or," as used in the specification and in the claims, should be understood to mean "either or both" of the elements so conjoined, i.e., elements that are conjunctively present in some cases and disjunctively present in other cases. Multiple elements listed with "and/or" should be construed in the same fashion, i.e., "one or more" of the elements so conjoined. Other elements may optionally be present other than the elements specifically identified by the "and/or" clause, whether related or unrelated to those elements specifically identified. Thus, as a non-limiting example, a reference to "A and/or B", when used in conjunction with open-ended language such as "comprising" can refer, in one embodiment, to A only (optionally including elements other than B); in another embodiment, to B only (optionally including elements other than A); in yet another embodiment, to both A and B (optionally including other elements); etc.

As used in the specification and in the claims, "or" should be understood to have the same meaning as "and/or" as defined above. For example, when separating items in a list, "or" or "and/or" shall be interpreted as being inclusive, i.e., the inclusion of at least one, but also including more than one, of a number or list of elements, and, optionally, additional unlisted items. Only terms clearly indicated to the contrary, such as "only one of or "exactly one of," or, when used in the claims, "consisting of," will refer to the inclusion of exactly one element of a number or list of elements. In general, the term "or" as used shall only be interpreted as indicating exclusive alternatives (i.e. "one or the other but not both") when preceded by terms of exclusivity, such as "either," "one of," "only one of," or "exactly one of."

"Consisting essentially of," when used in the claims, shall have its ordinary meaning as used in the field of patent law.

As used in the specification and in the claims, the phrase "at least one," in reference to a list of one or more elements, should be understood to mean at least one element selected from any one or more of the elements in the list of elements, but not necessarily including at least one of each and every element specifically listed within the list of elements and not excluding any combinations of elements in the list of elements. This definition also allows that elements may optionally be present other than the elements specifically identified within the list of elements to which the phrase "at least one" refers, whether related or unrelated to those elements specifically identified. Thus, as a non-limiting example, "at least one of A and B" (or, equivalently, "at least one of A or B," or, equivalently "at least one of A and/or B") can refer, in one embodiment, to at least one, optionally including more than one, A, with no B present (and optionally including elements other than B); in another embodiment, to at least one, optionally including more than one, B, with no A present (and optionally including elements other than A); in yet another embodiment, to at least one, optionally including more than one, A, and at least one, optionally including more than one, B (and optionally including other elements); etc.

The use of "including," "comprising," "having," "containing," "involving," and variations thereof, is meant to encompass the items listed thereafter and additional items.

Use of ordinal terms such as "first," "second," "third," etc., in the claims to modify a claim element does not by itself connote any priority, precedence, or order of one claim element over another or the temporal order in which acts of a method are performed. Ordinal terms are used merely as labels to distinguish one claim element having a certain name from another element having a same name (but for use of the ordinal term), to distinguish the claim elements.

Having thus described several aspects of at least one embodiment of this invention, it is to be appreciated that various alterations, modifications, and improvements will readily occur to those skilled in the art. Such alterations, modifications, and improvements are intended to be part of this disclosure, and are intended to be within the spirit and scope of the invention. Accordingly, the foregoing description and drawings are by way of example only.

What is claimed is:

1. A computer-implemented method, comprising:
   receiving a two-dimensional architectural plan for a building structure;
   converting the two-dimensional architectural plan into a first data file that contains information about a location, length, and style of each wall included in the architectural plan;
   obtaining, from the first data file, a list of walls to automatically generate a second data file that contains a list of panels to be constructed from the list of walls;
   generating, with a build manager, a set of commands to build a panel from the list of panels using a robotic builder having robotic machines configured to build the panel:
      selecting one or more robotic machines to build the panel based at least on panel cost;
      outputting the set of commands to the one or more robotic machines, the set of commands containing instructions for the one or more robotic machines to build the panel; and
      building with the one or more robotic machines the panel based on the set of commands.

2. The computer-implemented method of claim 1, wherein, when generating the list of panels to be constructed for each of the list of walls, the method further comprises:
integrating features for assisting with later steps in a structure-building process of the building into the list of panels.

3. The computer-implemented method of claim 1, wherein the second data file further includes information for manufacturing each of the list of panels, including a location and a type of lumber used for manufacturing each of the list of panels, and one or more fasteners for connecting the lumber together.

4. The computer-implemented method of claim 1, further comprising:
generating a panel book showing an overview of the building structure and every panel from the list of panels to be constructed.

5. The computer-implemented method of claim 1, wherein the one or more robotic machines are equipped with one or more end effectors to mount and/or connect tools for panel fabrication.

6. The computer-implemented method of claim 1, wherein the list of panels is determined by:
discretizing each wall into chunks of length; and
looping from a beginning point of the wall to an ending point of the wall, and calculating a cost of a set of panel splits ending at each point to identify an optimal set of panels based on the cost.

7. The computer-implemented method of claim 6, wherein the list of panels is determined based on a dynamic programming (DP).

8. The computer-implemented method of claim 7, wherein the building is based on building logic and the building logic is independent from the DP algorithm so that the DP algorithm is capable of being changed or switched out without a change to the building logic.

9. The computer-implemented method of claim 1, further comprising:
detecting exterior structures from the two-dimensional architectural plan to find a set of walls and/or sections of the walls that are on an exterior side of the building structure.

10. A system, comprising:
a processor; and
a memory, coupled to the processor, configured to store executable instructions that, when executed by the processor, cause the processor to perform operations comprising:
receiving a two-dimensional architectural plan for a building structure;
converting the two-dimensional architectural plan into a first data file that contains information about a location, length, and style of each wall included in the architectural plan;
obtaining, from the first data file, a list of walls to automatically generate a second data file that contains a list of panels to be constructed from the list of walls;
generating, with a build manager, a set of commands to build a panel from the list of panels using a robotic builder having robotic machines configured to build the panel:
selecting one or more robotic machines to build the panel based at least on panel cost;
outputting the set of commands to the one or more robotic machines, the set of commands containing instructions for the one or more robotic machines to build the panel; and
building, with the one or more robotic machines the panel based on the set of commands.

11. The system of claim 10, wherein, when generating the list of panels to be constructed for each of the list of walls, the operations further comprise:
integrating features for assisting with later steps in a structure-building process of the building into the list of panels.

12. The system of claim 10, wherein the second data file further includes information for manufacturing each of the list of panels, including a location and a type of lumber used for manufacturing each of the list of panels, and one or more fasteners for connecting the lumber together for each of the list of panels.

13. The system of claim 10, wherein the operations further comprise:
generating a panel book showing an overview of the building structure and every panel from the list of panels to be constructed.

14. The system of claim 10, wherein the one or more robotic machines are equipped with one or more end effectors to mount and/or connect tools for panel fabrication.

15. The system of claim 10, wherein the list of panels is determined by:
discretizing each wall into chunks of length; and
looping from a beginning point of the wall to an ending point of the wall, and calculating a cost of a set of panel splits ending at each point to identify an optimal set of panels based on the cost.

16. The system of claim 15, wherein the list of panels is determined based on a DP.

17. The system of claim 16, wherein the building is based on building logic and the building logic is independent from the DP algorithm so that the DP algorithm is capable of being changed or switched out without a change to the building logic.

18. The system of claim 10, wherein the operations further comprise:
detecting exterior structures from the two-dimensional architectural plan to find a set of walls and/or sections of the walls that are on an exterior side of the building structure.

19. The computer-implemented method of claim 1, wherein the two-dimensional structural plan comprises at least one of a portable document format (PDF) file or a drawing (DWG) file.

20. The system of claim 10, wherein the two-dimensional structural plan comprises at least one of a portable document format (PDF) file or a drawing (DWG) file.

* * * * *